C. LIDREN.
Reaping and Binding Machine.

No. 230,792. Patented Aug. 3, 1880.

Witnesses

Inventor
C. Lidren,

Attorneys

N. PETERS, PHOTO-LITHOGRAPHER, WASHINGTON, D. C.

C. LIDREN.
Reaping and Binding Machine.

No. 230,792. Patented Aug. 3, 1880.

Witnesses
M. C. McArthur
Columbus S. Choate

Inventor
C. Lidren
T. H. Alexander Hollist
Attorneys

C. LIDREN.
Reaping and Binding Machine.

No. 230,792.
Patented Aug. 3, 1880.

UNITED STATES PATENT OFFICE.

CHRISTOPHER LIDREN, OF LA FAYETTE, INDIANA, ASSIGNOR TO HIMSELF AND R. JACKSON, OF SAME PLACE.

REAPING AND BINDING MACHINE.

SPECIFICATION forming part of Letters Patent No. 230,792, dated August 3, 1880.

Application filed October 28, 1879.

*To all whom it may concern:*

Be it known that I, CHRISTOPHER LIDREN, of La Fayette, in the county of Tippecanoe and State of Indiana, have invented certain new and useful Improvements in Reaping and Binding Machines; and I do hereby declare that the following is a full, clear, and exact description thereof, reference being had to the accompanying drawings, and to the letters of reference marked thereon, which form part of this specification, in which—

This invention relates to a novel combined mowing, reaping, and self-adjusting harvester and binding-machine, convertible to either purpose, and embracing the necessary elements to adapt it to either use—viz., that of a mowing-machine or of a combined harvester and binder.

The leading features of my improvement may be briefly enumerated as follows: The manner of forming the main hollow axle of the machine in three sections and binding them together, adjusting the roller-boxes of the vibrating lever so as to tighten the rollers upon the cam-wheel in order to compensate for wear, the fast and loose mechanism for connecting or disconnecting the driving-wheels and axle, the arrangement of a self-adjusting seat-frame and flexible tongue-braces, the manner of connecting the knife-pitman with the cutter-bar and the vibrating lever so that it can be attached to or detached therefrom without the use of a nut or wrench, the connection between the main frame and the frame of the harvester and binder, the arrangement of the compressors and mechanism for operating the same, the arm for carrying the wire around the bundle and the devices for reciprocating the same, the wire-twister actuated by a rack and pinion, and a hook upon the outside compressor for moving the rack at proper intervals, the cam-shield arranged to guard the twister from engagement with the wire while the compressors are moving together, all as hereinafter described and claimed.

To enable others skilled in the art to make and use my invention, I will proceed to describe the same with reference to the annexed drawings.

The main frame A, which is preferably composed of a single casting, is made with half-boxes or partial casings formed for the main axle, actuating-cam, and adjustable roller-boxes of the rock-shaft, which, through the medium of a connecting-pitman, imparts the usual reciprocating motion to the cutter-bar.

The cap $a$ is likewise formed with half-boxes or partial casings, and in this respect it is the counterpart of the main frame, upon which it is bolted.

The main carrying and driving wheels B B' are mounted loosely upon the main hollow axle $b\ b'\ b^2$, which is supported in the said wheels and provided with the fast and loose mechanism for making them turn with or independently of the axle. This axle is cast in three sections, $b$, $b'$, and $b^2$, which are clutched together, so as to form a continuous hollow shaft. The central cam-section, $b^2$, of this axle is formed with beveled shoulders at its ends, so that when inclosed by the boxes of the main frame and cap the whole can be tightened up in order to compensate for such wear as may occur to the parts; and to this end the said sections are held together and the driving-wheels maintained in position upon the axle by means of a bolt, $b^4$, passed through the axle, and provided at its ends with nuts $b^5$, which, when tightened up, serve to wedge the clutches of the sections together, and thus insure a solid and perfect motion. The axle thus constructed may be repaired when worn with greater facility than those formed in the usual way, as it is not necessary to remove the cap of the main frame in order to remove and replace the end sections, which are the ones to receive the most wear and need repairing soonest.

Upon one end of the bolt $b^4$ is fitted a washer, which prevents contact of the nut with the driving-wheel, while upon the grain side of the machine such washer may be dispensed with, since the driving sprocket-wheel $b^6$, which clutches with the main axle and actuates the binding mechanism, subserves the purpose of a washer.

The cam-wheel C, which imparts a vibratory motion to the lever C', pivoted to the main frame, is cast with the central section of the hollow axle and inclosed by the boxes of the main frame and cap. This cam-wheel acts upon rollers $c$, which are journaled in boxes $c'$ $c^2$, having a lateral adjustment within a pivoted frame, $c^3$, so that the rollers may be tightened against the cams to compensate for any wear that takes place either in the cam or the rollers. As a means for effecting this adjustment of the boxes, I arrange alongside of either or both of them a wedge-shaped key, $c^4$, which is tightened up against the said roller-boxes by a set-screw, $c^5$, passed through the front of the pivoted frame in which the boxes and rollers are arranged. This pivoted frame is formed upon the rear end of the vibrating lever C', and is inclosed by the boxes of the main frame and cap. Access is had to the screw $c^5$ through an opening left between the main frame and cap for the vibratory lever, and hence the same will be available for the purpose of adjusting the roller-boxes without disconnecting any of the parts of the machine.

The pawls D, which engage with the internal ratchets of the driving-wheel hubs for the purpose of connecting them with the main axle, are pivoted to disks $d$, upon the outer sections of the axle. The pawls are formed with bent arms $d'$, which project through slots formed in the disks in such manner that when the said arms are forced outward or toward the peripheries of the disks the pawls will be disengaged from the ratchets of the driving-wheels. The means devised for thus actuating the pawls consist of sliding conoidal collars $d^2$ $d^2$, arranged upon the main axle between the disks and the main frame of the machine. When these collars are moved outwardly upon the axle, so as to come between the same and the pawl-arms, the latter will be forced out or away from the axle, and the pawls consequently thrown out of gear. When said sleeves are retracted toward the main frame the pawls will be left free for engagement with their ratchets.

To effect a simultaneous movement of the sliding sleeves I form them with arms $d^4$, having lugs $d^5$, which engage with slots $e$ at the ends of an adjustable sliding yoke, E. These slots, being formed diagonally in yoke-tines, act as cams upon the lugs of the sleeve-arms, so that when the yoke is moved backward or toward the rear of the machine the sleeves will be forced into contact with the pawl-arms, and when the yoke is drawn forward the sleeves will be retracted, and hence freed from the pawls.

The yoke, which embraces the half-box $e^2$ of the cap $a$, slides under guide-lugs $e^3$, and is adjusted in position by either fitting its forward end upon a pin, $e^4$, or by drawing the yoke forward by means of its hook end $e^5$ and catching the yoke-frame over said pin. This pin is screw-threaded and provided with a nut, whereby the yoke may be set at a proper inclination, and the said parts are arranged upon the cap of the main frame somewhat in advance of the driver's seat, so that the yoke will be conveniently accessible during the use of the machine.

It is always desirable that the seat should be adjustable in such a way that the weight of the driver may be disposed at the proper point to balance the machine either as to pressure upon the horses' necks or its draft upon the ground. I therefore mount the seat F upon an arm, $f$, which is secured to a frame, $f'$, and to the forward end of this frame I secure the tongue or draft-pole $f^2$. The frame $f'$ is provided with the angle-irons $f^3$ upon its under side, and is mounted upon bearings $f^4$, so as to have both a tilting or rocking and also a sliding movement.

Upon the arms of a cross-bar, G, which is bolted to the tongue, are pivoted the inclined brace-rods $g$, which are also pivoted at their lower ends to the sides of the frame, thus forming a flexible connection between the frame and tongue.

Within convenient reach of the driver is a hand-lever, H, which is pivoted upon a fixed sector-rack, $h$, and carries a pawl, $h'$, with a spring behind it. The pawl, which takes into the rack, is disengaged therefrom by a latching-lever, $h^2$, connected with the pawl by any suitable flexible connection. The hand-lever is connected with the shoe or front extension, A', of the main frame by a rope or chain, $h^3$, one end of which is fastened to the shoe and the other end to a short bar, $h^4$, pivoted in a groove at the lower end of the lever. The chain $h^3$ passes over a pulley-wheel, I, mounted upon one end of the cross-bar G, which, as before mentioned, is secured to the pole or tongue. This arrangement is of especial use when the machine is converted into a mower and a floating cutter-bar employed, as hereinafter set forth, and is adapted for raising and lowering the shoe, thus leaving the bar and forward end of the machine to float free, the same being balanced by the weight of the driver, and the draft attachment to the main frame being below and forward of the line of the main axle.

K designates the frame which carries the cutting and binding mechanism, and which is supported upon one side by the wheel $k$, and upon its other or inner side by flexible connections consisting of a coupling at the rear and center of the main frame A and a coupling-pin at the forward extension or shoe, A'.

The shoe of the main frame is formed with an upright post, L, at its toe, and a lug, $l$, at its heel, the former of which is hollow and slotted at its rear from its base nearly to its top, to form a socket for the coupling-pin $l'$, while the lug $l$ is formed with a socket for the rear end of the pin. This pin is passed through an arm, $l^2$, of the frame K, so as to connect the same with the main body of the machine, and it is widened and flattened at its end which enters the recessed post, so that when it is passed into the same and turned a quarter way round it will be held within the recess by reason of its flattened end, which is somewhat wider than the slot. In disconnecting the parts a like movement will bring the pin in such position that its forward end may be raised and withdrawn through the slot of the post.

The coupling at the rear of the main frame consists of a stud upon the frame and a sleeve or socket upon an arm of the frame K. The platforms M M' are secured to the rear and front of the frame K at a proper distance apart to leave a space for the compressors to move in. The front platform is provided with two end plates, $m$, which, when the platform is secured in place, are fastened down upon the dividers $m'$, so as to constitute parts of the same.

The finger-bar $m^3$ is bolted to the dividers $m'$, and for the purpose of rendering it adjustable forward or backward, for cutting long or short grain, so that it will fall upon the platform in proper position for binding, I form each of the said dividers with a series of holes, so that the finger-bar may be set and bolted down in the position required.

The cutter-bar works through a guide, $m^4$, upon the finger-bar, and is also guided by a grooved block, $m^5$, which is formed upon its end, and adapted to engage with a rib, $m^6$, upon the finger-bar, whereby the said cutter-bar will be guided in a perfectly-true right line.

The knife-pitman N, which connects the cutter bar with the vibrating lever of the machine, is formed at one end with a slot, $n$, which fits upon a pin, $n'$, of the lever, and is provided at its other end, which is forked, with a pivoted box, which fits upon a pin, $n^2$, on the cutter-bar. This pivoted box is prevented from slipping off from the pin $n^2$ by means of a spring-pin, $n^3$, which is passed through the upper end of the stud or pin upon which the box is fitted. The slot $n$ is formed in an enlargement or ball at one end of the knife-pitman.

The pin upon the end of the vibrating lever is provided with a head having its longest dimension in a vertical line, so that in order to connect or disconnect the two the operator will raise the pitman to a vertical line, so that the length of the slot will be coincident with the length of the head upon the pin, and hence the parts be in position for connection or disconnection.

The spring-pin can be readily detached by hand from the pin on the cutter-bar, and hence the knife-pitman can be either attached or detached without the use of a wrench. Such connection will also insure perfect work, whether the finger-bar be moved forward or backward of a center line. It will also be observed that no bolts or nuts are employed in such attachment, and that when the pitman has been thus connected with the vibrating lever and cutter-bar it will be securely held in place and constitute a flexible joint.

For operating the binding mechanism motion is first obtained from the driving sprocket-wheel $b^6$, upon the main axle, by means of a chain passed around the same and a clutch sprocket-wheel, O, located upon the frame K, in rear of the main driving-wheels. This sprocket-wheel O, which has a short hollow clutch-shaft, $o'$, projecting above a plate, $o^2$, is arranged to turn loosely upon the shaft of a lower sprocket-wheel, $o^3$. In order to connect these two wheels so as to impart motion to the binding mechanism, I have arranged within convenient reach of the driver a spring shipping-lever, $o^4$, which carries a clutch-sleeve, $o^5$, swiveled in a slot at the end of the lever, and adapted to be forced by spring-pressure into engagement with the projecting square end of the shaft belonging to the lower sprocket-wheel. At the same time that it engages with said shaft it is also clutched with the hollow axle of the upper sprocket-wheel, whereby both wheels will be connected so as to rotate together.

Motion is communicated from the lower sprocket wheel to a combined sprocket and crank wheel, P, through the medium of a chain, $p$. This crank-wheel actuates the outside compressor by means of a pitman, $p'$, and this compressor, in turn, actuates the inside compressor through the medium of a chain, pulleys, and flexible connections, so that during the rotation of the crank-wheel the two compressors will move simultaneously toward and away from each other for the purpose of gathering the grain into bundles and actuating the binding mechanism which binds the same into sheaves.

The inside and outside compressors, Q Q', are arranged to move upon a horizontal guide-bar, $q$, each compressor being formed with a base-plate, $q'$, at the foot of its standard, said plates being flanged and applied upon the bar so as to slide freely thereon.

To the outside compressor is pivoted a sector-plate, R, to which is hinged an inclined slotted bar arranged to slide upon a guide-pin, $r'$, projecting from the rear part of the outside divider. The slot of this bar is so proportioned as to length that while the compressors are moving together, and before they have arrived at the pause which precedes their return movement, the bar will be arrested by the pin $r'$ and thereby force the segmental plate upon the gavel between the compressors.

It will be observed that when the compressors are drawn to the center in binding a gavel that they will, in conjunction with the pivoted sector-plate and bar, constitute a complete divider of the grain that is falling from that which is being bound, such separation being absolutely essential to insure a successful operation in automatic binding.

The wire-carrier or binding-arm consists of a pivoted arm, S, supported upon the standard of the inside compressor. It is depressed at the proper time so as to bring the wire down across the bundle before the compressors have paused at their extreme limit of motion. The said arm is provided with pulley-wheels or rollers $s$ and guides $s'$ for the wire which is being fed out for binding. The reciprocating movement of this binding-arm is derived from a slotted bar, $s^2$, which is pivoted at its outer end to the lower extremity of the arm, and which has its slotted portion arranged to slide upon a pin, $s^3$, between two guide-plates secured to the main frame K. While the compressors are being drawn together, and before they have reached their extreme position, the pin $s^3$ will arrest the motion of the bar by contact at the extreme end of the slot with the bar. When the outward movement of the bar is thus arrested it will necessarily cause the binding-arm to be depressed as the compressor is moved toward the center. The slot in this bar curves upwardly at its outer terminus, so as to form a recess, $s^4$, in which the pin will rest when it checks the outward movement of the bar. This recessed part $s^4$ of the bar so catches upon the pin that while the compressors are being drawn apart after the wire has been passed around the bundle of grain the bar will be held stationary until the wire-carrying arm has been caused to turn back upon its fulcrum in order to free it from the sheaf. After this movement of the said arm, however, a cam-projection, $s^5$, upon the compressor strikes upon a flange, $s^6$, on the slotted bar, and thereby raises the same, so that the pin will be in line with the straight slot and admit of the bar being pushed out with the inside compressor.

The wire is fed from a spool, T, which is mounted upon a stud, $t$, on the inside compressor-standard, a rubber tension-spring, $t'$, being also arranged upon the said stud for the purpose of regulating the tension of the wire.

It will be observed that the binding-arm S in its upward or downward movement neither slackens nor tightens the wire, such being accomplished entirely by the tightening or loosening of the spool, for which purpose a tightening-nut is employed upon the end of the stud $t$.

The wire from the spool passes over the pulley-wheels and through the guide-eyes of the binding-arm S, and thence down to the device for clamping its end. The grain is formed into a bundle against the wire by the compressors, and as the binding-arm descends on the side of the bundle opposite to the inside compressor it brings the wire entirely around the bundle, so that it will be caught by the cutting and holding and also by the twisting devices. The wire is cut off and twisted, and the loose end is held as the wire-carrying arm rises, so that the wire will extend from the holder to the spool, as before mentioned, ready for the next bundle.

I will now describe the holding, cutting, and twisting devices.

Between two plates, U, formed with or secured to the base of the inside compressor-standard, I journal a pinion, $u'$, and a combined four-armed cutter and holder, $u^2$, the former of which is actuated at certain intervals by a sliding rack-bar, V, and the latter—that is, the cutter and holder—at certain intervals by a hook, $v'$, upon the outer compressor. The axis of the pinion extends above the upper one of the plates U, and carries the wire-twister W, which is composed of a plate formed with a slot, $w'$, and is provided with a pivoted lever, $w^2$, which is acted upon at the proper time by a hook, 1, upon the outside compressor, so as to secure the wire in the slot for twisting.

Upon the under side of the outer compressor is a pivoted hook, 2, provided with a weighted arm, 3. It is arranged to engage with a slot formed in the forward end of the sliding rack-bar V when the compressors are drawn together. As a means of disconnecting this hook from the sliding rack-bar while the compressors are receding from each other, and after the rack-bar has been drawn outward by the hook so as to cause the requisite rotation of the wire-twister upon the shaft of the pinion with which the sliding rack-bar gears, I provide a cam-projection, 4, upon the frame K, against which the weighted arm of the hook 2 will strike at the proper moment, and thereby be elevated, so as to free the hook from the slot in said rack-bar.

Upon the upper one of the plates U, I arrange a pivoted shield, 5, for the purpose of shielding the twister and preventing it catching the wire that is being held by the four-armed cutter and holder while the sheaf is being compressed.

Figure 1:
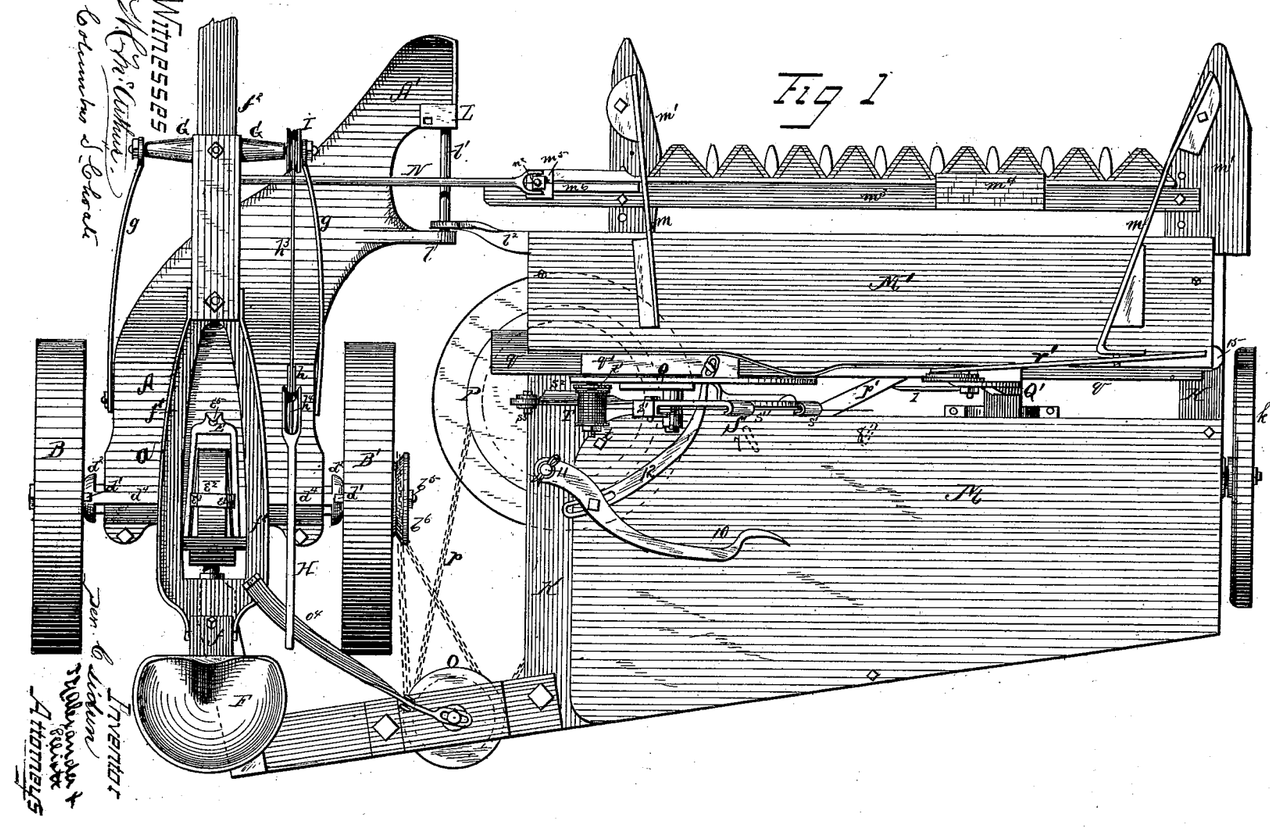
Figure 1 is a plan view.
Figure 2:
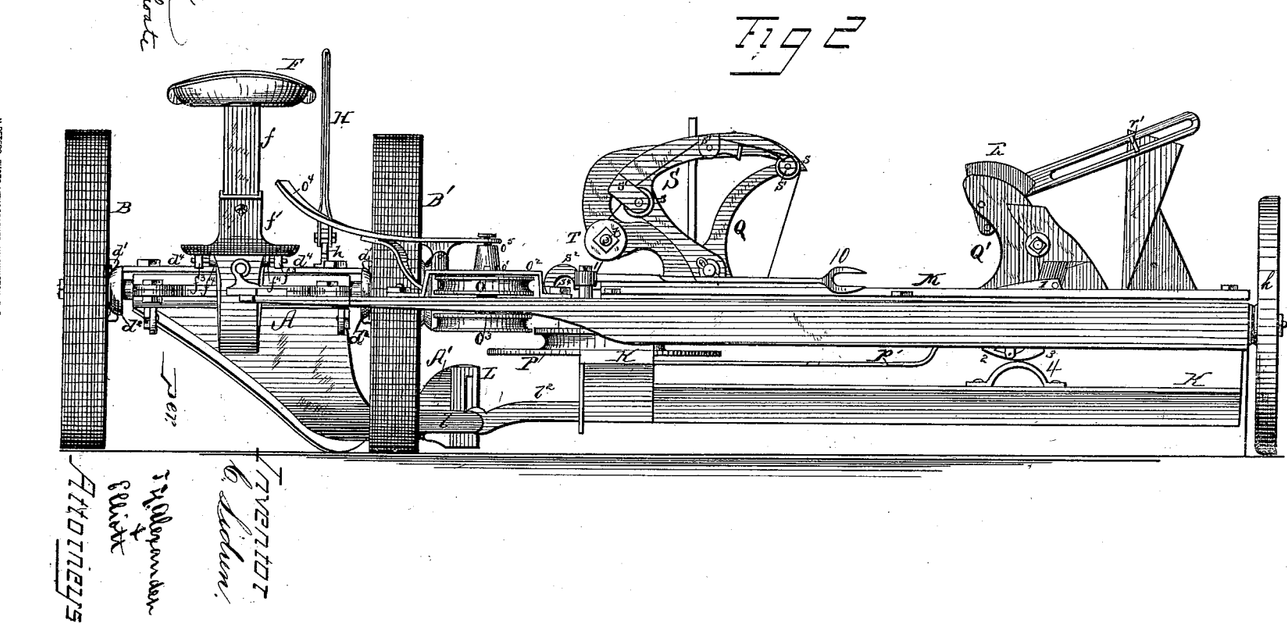
Fig. 2, a rear view.
Figure 3:
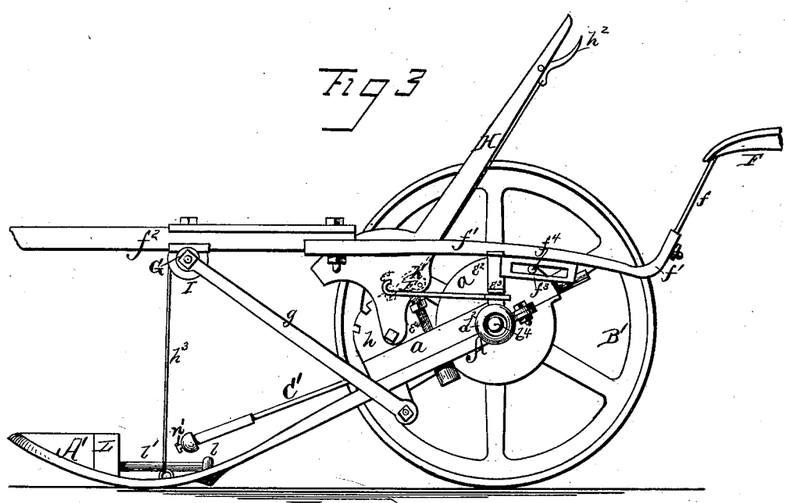
Fig. 3, an end elevation with one wheel removed.
Figures 4, 5, 8:
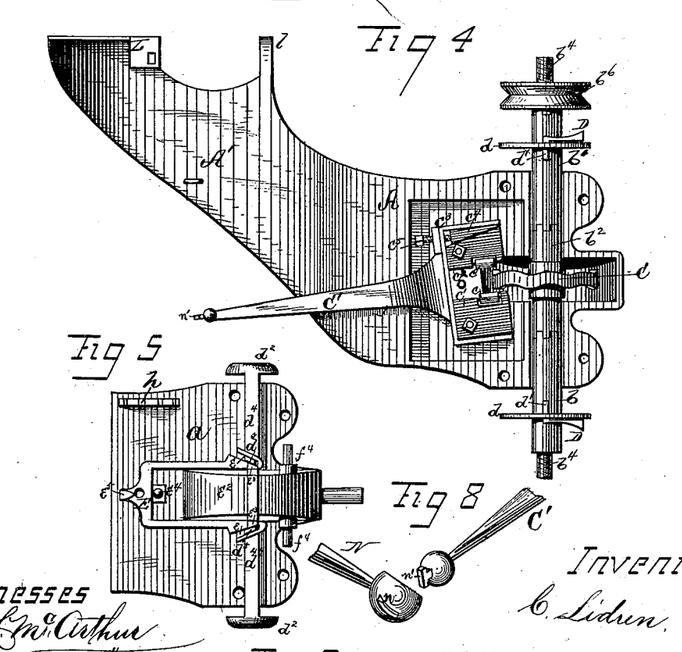
Fig. 4, a plan view of the main frame with the cap removed.
Fig. 5, a plan view of the cap.
Figs. 8 and 9 are details of the vibrating lever and knife-pitman with their connections.
Figures 6, 7:
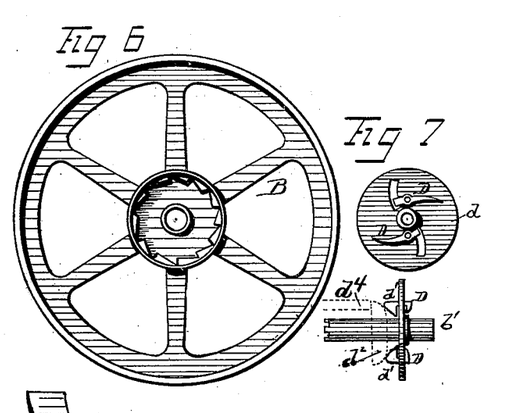
Figs. 6 and 7 are details of the wheels.
Figure 9:
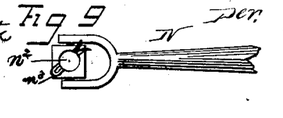
Figure 10:
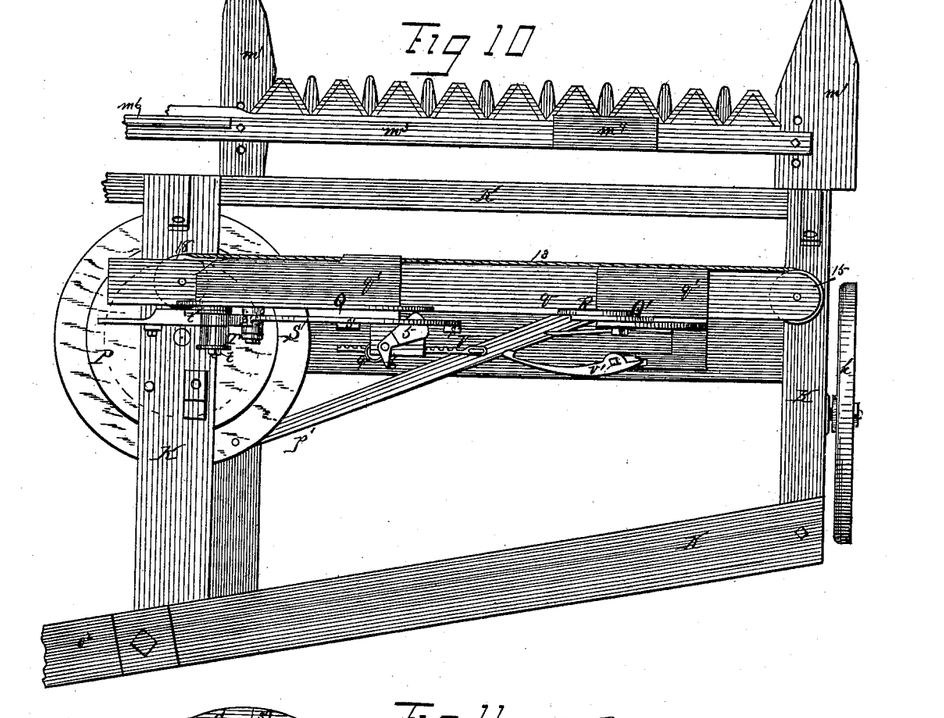
Fig. 10 is a plan view of the binder with the top plates or platforms removed.
Figure 11:
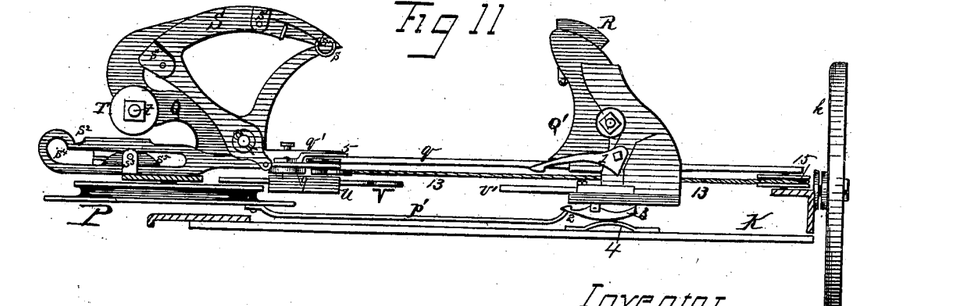
Fig. 11 is a central longitudinal section of the same.

The operation of this shield is as follows: When the inside compressor, with its attachments, is drawn inward, the cam 6, that is formed upon the shield, is engaged by a dog, 7, located upon the platform at the proper place, which forces the plate forward and over the twister. Then, again, as the compressor moves outward, another dog, 8, (shown in dotted lines in Fig. 1,) upon the platform engages the cam 6 and forces the plate or shield off the twister, thus leaving it ready at the proper time for receiving and twisting the wire. This feature is necessary, since it will be observed that as the compressor advances the rack causes the pinion and twister to revolve in the opposite direction from that in which the same revolve in twisting the wire as the compressors are drawn apart and the rack drawn forward by the hook, as heretofore described.

Figures 12, 13, 16, 17, 18, 19:
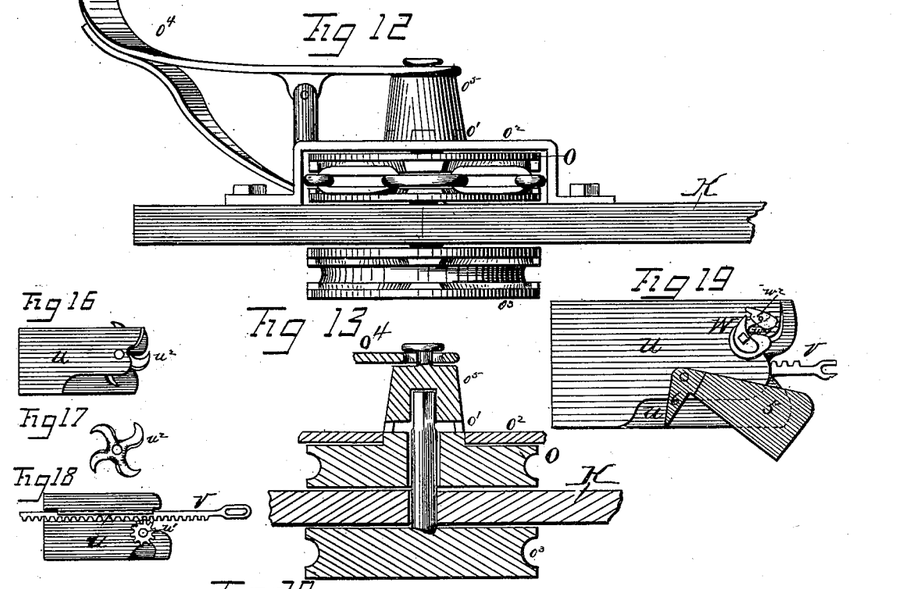
Fig. 12 is a rear view, enlarged, of the intermediate sprocket-wheels.
Fig. 13 is a central section of the same.
Figs. 16, 17, 18, 19, and 20 are detail views of the cutting and twisting mechanism with their different parts.
Figures 14, 15:
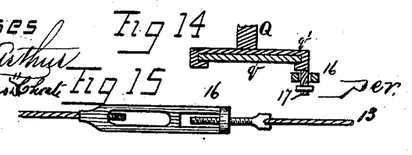
Figs. 14 and 15 are detail views of the drive-chain attached to the compressors.
Figures 20, 21:
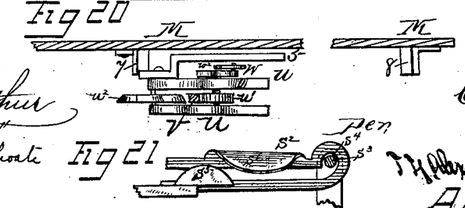
Fig. 21 is a view of the curved lever which actuates the binding-hook.
Figure 22:
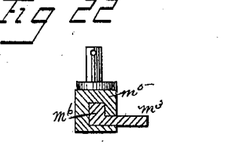
Figs. 22 and 23 are detail views of the knife-guides and finger-bar.
Figure 23:
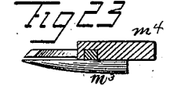

As the grain is bundled between the compressors the loose end of the wire will be held by the four-armed cutter and holder, which, as shown in Fig. 17, has the cutting-edge at the top of its arms, and the lower holding-edge rounded off, so as to clamp or gripe the wire without cutting it.

The hook $v'$, as the compressors reach the center, is forced into engagement with one of the cutter-arms by means of a spring, 9, so that when the compressors are drawn apart the cutter will be turned one-fourth revolution by the said hook, thus cutting off the wire, and also securing the same under the rounded edge of one of its cutter-arms, ready for the next gavel.

The hook 1, when the compressors are brought together, engages with the small lever $w^2$ upon the twister, so that when the compressors commence to recede from each other it will pull said lever round until it has locked fast within the slot of the twister the ends of the wire which is around the sheaf, and by means of the rack-bar and pinion the twister is then rotated so to securely twist the ends of the wire and effectually bind the sheaf. After the sheaf is thus secured it will be carried with the inside compressor a short distance, until caught by the tines of a horizontally-reciprocating fork, 10, which removes it from the platform by a swinging movement to the rear of the machine, where it is deposited on the ground out of the way of the team in passing around the field during the operation of cutting the grain.

The discharging-fork is pivoted upon a post, 11, and is connected with the slotted end of a pitman, 12, by a suitable pin or bolt. This pitman is connected with the inside compressor, and arranged in proper position for causing the fork to remove the sheaf without interfering with the falling grain.

The chain or rope 13 is connected with the outside compressor by a link, and is passed round a pulley, 15, at the outer side of frame K, and thence to a link, 16, to which it is connected by a screw-bolt, so that it may be tightened or loosened at pleasure. This link slides with a limited movement upon a lug, 17, on the under side of the inside compressor, and from said link a chain passes around a pulley-wheel, 18, and thence to the outside compressor.

By means of the limited play of the link 16 the outside compressor may be made to move outward slightly in advance of the starting of the inside compressor, so as to give time for the wire to be firmly griped by the cutting and twisting devices.

By the hereinbefore-described connections between the main frame and the reaping and binding devices it will be seen that the same may be readily detached, so as to apply a cutter-bar to the machine, which will convert the same into a mower. To effect such change a finger-bar may be made in any suitable way for connection with the main frame, the cutter-bar will be connected with the knife-pitman, as hereinbefore described, and by then letting down the hand-lever the machine will be converted into a mower having a cutter-bar well balanced by the weight of the driver.

What I claim, and desire to secure by Letters Patent, is—

1. The hollow axle supported in the driving-wheels and cast in three sections clutched together, the ends of the central or cam section being formed with beveled interlocking fingers, and the whole tightened up by nuts upon the ends of a rod passed through the axle from end to end, substantially as shown and set forth.

2. The cam-wheel, the roller-boxes at the rear end of the vibrating lever, said boxes carrying rollers alongside of the cam-wheel, and the keys for adjusting the boxes and tightening up the rollers against the cam-wheel in order to compensate for wear, the said members being combined for operation, substantially as herein shown and set forth.

3. The pawls D, pivoted upon a disk, $d$, provided with slots through which arms of the pawls are passed, in combination with the ratchets of the driving-wheels, sliding collars arranged upon the axle and provided with arms having lugs at their ends, and the adjustable sliding yoke adapted to simultaneously act upon the arms of the collars so as to cause them to move toward or away from the pawls, substantially as and for the purposes herein set forth.

4. The combination of the self-adjusting sliding and tilting seat having a slotted frame mounted upon bearings on the cap of the main frame, the tongue secured to the sliding-seat frame, flexible braces pivoted to the tongue and frame of the machine, the hand-lever, and flexible connection between the lever and main frame or shoe, substantially as set forth.

5. In combination with the driving mechanism and cutter-bar, the knife-pitman with a pivoted box at one end adapted to fit upon a stud on the cutter-bar, and a ball at its other end formed with a slot adapted to be passed over the head of a pin upon the rock-shaft of the driving mechanism only when the pitman is raised to a vertical position, substantially as shown and set forth.

6. The forward extension or shoe of the main frame, formed at its toe with a hollow post slotted in rear from its base nearly to its top, a recessed lug upon the heel of the shoe, and a pin for connecting an arm of the reaping and binding frame between the post and lug, said pin having its forward end flattened with reference to the width of the slot, and broadened so as to be wider than the same, the said members being combined and arranged substantially as and for the purposes set forth.

7. The outside and inside compressors, adapted to travel toward or away from each other, the sector-plate pivoted to the outside compressor and connected with a slotted inclined bar adapted to force the same upon the bundle when the compressors are brought together, and the crank-wheel, pitman, and chain or flexible connection between the two compressors, all of these members being combined for operation, substantially as set forth.

8. A binding-arm provided with guide-rollers and guides for carrying the wire around the bundle and pivoted to the standard of the inside compressor, in combination with a slotted bar pivoted to the lower end of said arm, and a guide-pin and cam for acting upon the bar, and thereby reciprocating the binding-arm, substantially as set forth.

9. The four-armed wire cutter and holder secured upon a spindle between plates formed with or attached to the inside-compressor standard, in combination with the hook connected with the outside compressor, and adapted, as the compressors are drawn apart, to cause a partial revolution of the cutter, the said cutter being formed with upper cutting-edges and lower rounded holding-edges for the wire, all as shown and set forth, and for the purposes specified.

10. The wire-twister composed of a slotted plate mounted upon the spindle of a pinion which is arranged between the two plates of the inside-compressor standard, in combination with the lever pivoted upon said slotted plates of the twister, in position to lock the wire within the slot, the sliding rack adapted to engage with said pinion, and a hook upon the outside compressor adapted to engage at intervals with said rack, substantially as and for the purposes set forth.

11. A cam-shield pivoted above the twister, in combination with dogs arranged upon the platform in position to act upon said shield and alternately throw the same over and away from the twister, substantially as set forth.

In testimony that I claim the foregoing as my own I affix my signature in presence of two witnesses.

CHRISTOPHER LIDREN.

Witnesses:
  EDWARD P. HUTCHINSON,
  JOSEPH RICE.